United States Patent [19]

Alsenz

[11] Patent Number: 5,115,644
[45] Date of Patent: May 26, 1992

[54] METHOD AND APPARATUS FOR CONDENSING AND SUBCOOLING REFRIGERANT

[76] Inventor: Richard H. Alsenz, 2402 Creekmeadow Dr., Missouri City, Tex. 77459

[21] Appl. No.: 505,557

[22] Filed: Apr. 6, 1990

Related U.S. Application Data

[63] Continuation-in-part of Ser. No. 146,285, Jan. 21, 1988, Pat. No. 4,951,475.

[51] Int. Cl.$^5$ ............................................. F25D 17/00
[52] U.S. Cl. ...................................... 62/181; 62/211; 62/DIG. 17
[58] Field of Search .................. 62/509, 211, DIG. 17, 62/498, 181

[56] References Cited

U.S. PATENT DOCUMENTS

| 3,238,737 | 3/1966 | Shrader et al. | 62/174 |
|---|---|---|---|
| 4,012,921 | 3/1977 | Willitts et al. | 62/151 |
| 4,068,494 | 1/1978 | Kramer | 62/509 X |
| 4,136,528 | 1/1979 | Vogel et al. | 62/DIG. 17 X |
| 4,167,102 | 9/1979 | Willitts | 62/157 |
| 4,193,781 | 3/1980 | Vogel et al. | 62/DIG. 17 X |
| 4,457,138 | 7/1984 | Bowman | 62/196.1 |
| 4,566,288 | 1/1986 | O'Neal | 62/196.1 |
| 4,621,505 | 11/1986 | Ares et al. | 62/509 X |
| 4,735,059 | 4/1988 | O'Neal | 62/196.4 |

OTHER PUBLICATIONS

Engineering Thermodynamics; Stoever 1951 pp. 28, 29.

Primary Examiner—William E. Wayner

[57] ABSTRACT

This invention provides a refrigeration system which includes in a closed loop connection a compressor for compressing a refrigerant into a condenser for condensing the compressed refrigerant into a liquid refrigerant, a control valve for controlling the discharge of the liquid refrigerant from the condenser into a reservoir, a sensor for measuring the temperature of the liquid refrigerant near the control valve, a fan for circulating air through the condenser, a sensor for measuring the ambient temperature of the airflow through the condenser and an electronic control system to control various functions of the refrigeration system, including the flow of the liquid refrigerant through the condenser as function of the temperature difference between the ambient temperature and the temperature of the liquid refrigerant. During operation, a minimal flooding of the condenser is always maintained, i.e., a certain amount of liquid refrigerant is always trapped to thereby subcool the liquid refrigerant before discharging it into the reservoir at all ambient temperatures. The liquid refrigerant flow is decreased when the temperature difference is greater than a predetermined value and is increased when the temperature difference is less than the predetermined value. Further improvements in efficiencies are obtained by controlling air flow through the condenser and compressing refrigerant vapors from the reservoir into the condenser.

9 Claims, 4 Drawing Sheets

METHOD AND APPARATUS FOR CONDENSING AND SUBCOOLING REFRIGERANT

CROSS-RE RELATED APPLICATIONS

This application is a continuation-in-part application to copending U.S. patent application Ser. No. 146,285, filed Jan. 21, 1988.

BACKGROUND OF THE INVENTION

1. Technical Field

This invention relates to a refrigeration system and more particularly to an apparatus and method for improving refrigeration system efficiencies with improved subcooling control during varied ambient conditions.

2. Description of Prior Art

It has been known in the art of refrigeration systems that the net refrigerating effect in a refrigeration system can be improved by producing subcooling of the liquid refrigerant. Subcooling the refrigerant means that further energy is taken out of the liquid refrigerant and as a consequence it does not have to be removed by the expansion process in the cooling evaporator, thus improving the overall efficiency of the refrigeration system. As an example, it has been known that when a refrigerant leaving a condenser of a refrigeration system has been accumulated in a reservoir, it can then be circulated in the liquid form through another cooling section to produce subcooling of the refrigerant at a small additional operating cost. This method, however, requires an increased amount of refrigerant, which is undesirable.

In a refrigerator system, it is typical to equip a condenser with a flood control means which elevates the condensing pressure of a refrigeration system during low ambient temperatures by reducing the effective condenser surface that is available for condensing. This is accomplished by filling the condenser with liquid refrigerant when the pressure is not sufficient. These systems necessarily require increasing amounts of excess refrigerant to accomplish this flooding technique as the ambient temperature drops. This results in the use of additional refrigerant, which is undesirable because commonly used refrigerants, like Chloro-Fluoro-carbons ("CFCs"), are believed to increase the ozone depletion problem in the upper atmosphere. The additional refrigerant charge is generally lost when a leak occurs, which happens on the average several times over the life of a refrigeration system. This extra refrigerant usage may dramatically increase the amount of leakage of CFCs from refrigeration systems.

Refrigeration systems currently available also attempt to maximize the subcooling effect during the colder periods of the year, i.e., at lower ambient temperatures. These systems require increased amount of refrigerant to flood the condenser surfaces. One such system is described in U.S. Pat. No. 4,831,835, which performs subcooling during periods of low ambient temperature by utilizing a relatively complicated valve arrangement. This system ignores the subcooling at some ambient temperatures and instigates complicated measures to take advantage of subcooling in cold ambient temperatures. Subcooling of a refrigerant to a temperature that is closer to the ambient temperature of the systems will produce better efficiencies at all times of the year. Thus, subcooling within the condenser itself at all times, i.e., at all ambient temperatures, is a very desirable feature to have in a refrigeration system, which has gone unrecognized in the art.

U.S. Pat. No. 4,621,505 also describes an arrangement to improve the subcooling effects during low ambient conditions. With respect to subcooling at higher ambients, this patent suggested that in summer operations when the ambient is above 85 to 90 degrees F., the condensation temperature and head pressures will be higher and little or no economic benefit can be expected. The need to benefit from subcooling has been known for some time in the refrigeration industry; however, to date, no method for achieving subcooling in a condenser at all ambients (high or low) has succeeded in the market place.

Another type of a subcooling system is disclosed in U.S. Pat. No. 4,136,528. It describes a system which provides subcooling to a degree that is sufficient to insure that the expansion valves operate properly in colder ambient conditions. This system fails to recognize that the subcooling in the summer time can provide further energy savings. This is another example where the need to subcool has been recognized for colder ambients but the value of subcooling in higher ambients has been ignored.

The attempts of the past to build-in subcooling into a condenser have failed to recognize the necessity of holding the refrigerant in the liquid state for some time before allowing it to leave the condenser. In order to make thermal expansion valves function, hold-back valves have been used in the condensate line leaving the condenser to elevate the condensing pressure during low ambient conditions. This method produces liquid subcooling when the condenser is flooded with liquid. Once the industry recognized the benefits of subcooling, various methods have been utilized to subcool the refrigerant in colder ambient conditions. The hold-back valves used for this purpose have throttling ranges from fully open to fully closed of 20 to 60 psi have been used, which meant that an additional inefficiency of higher condensing pressures during higher ambient and higher flow conditions were introduced.

The present invention provides a refrigeration system and method for increasing the subcooling effect of the condenser while utilizing minimal amounts of refrigerant. This system provides subcooling of the condenser during all ambient temperatures.

SUMMARY OF THE INVENTION

The invention provides for a refrigeration system which has in a closed loop a compressor for compressing a refrigerant, a condenser for condensing the compressed refrigerant into a liquid refrigerant, a control valve for regulating the liquid refrigerant flow through the condenser in a manner so as to subcool the liquid refrigerant to a desired level at all ambient temperature during normal operations. An electronic control system is provided to control various functions of the refrigeration system, including the refrigerant flow through the control valve.

The control system causes the flow through the control valve to increase when the temperature difference between the temperature of liquid refrigerant and the ambient is less than a predetermined value and causes the flow to decrease when the temperature difference is greater than the predetermined value.

Examples of the more important features of the invention thus have been summarized rather broadly in order that the detailed description thereof that follows may be better understood, and in order that the contribution to the art may be better appreciated. There are, of course, additional features of the invention that will be described hereinafter and which will form the subject of the claims appended thereto.

DESCRIPTION OF THE DRAWINGS

For detailed understanding of the present invention, references should be made to the following detailed description of the preferred embodiment, taken in conjunction with the accompanying drawings, in which like parts are given like reference numerals and wherein.

DESCRIPTION OF PREFERRED EMBODIMENTS

Figure 1:
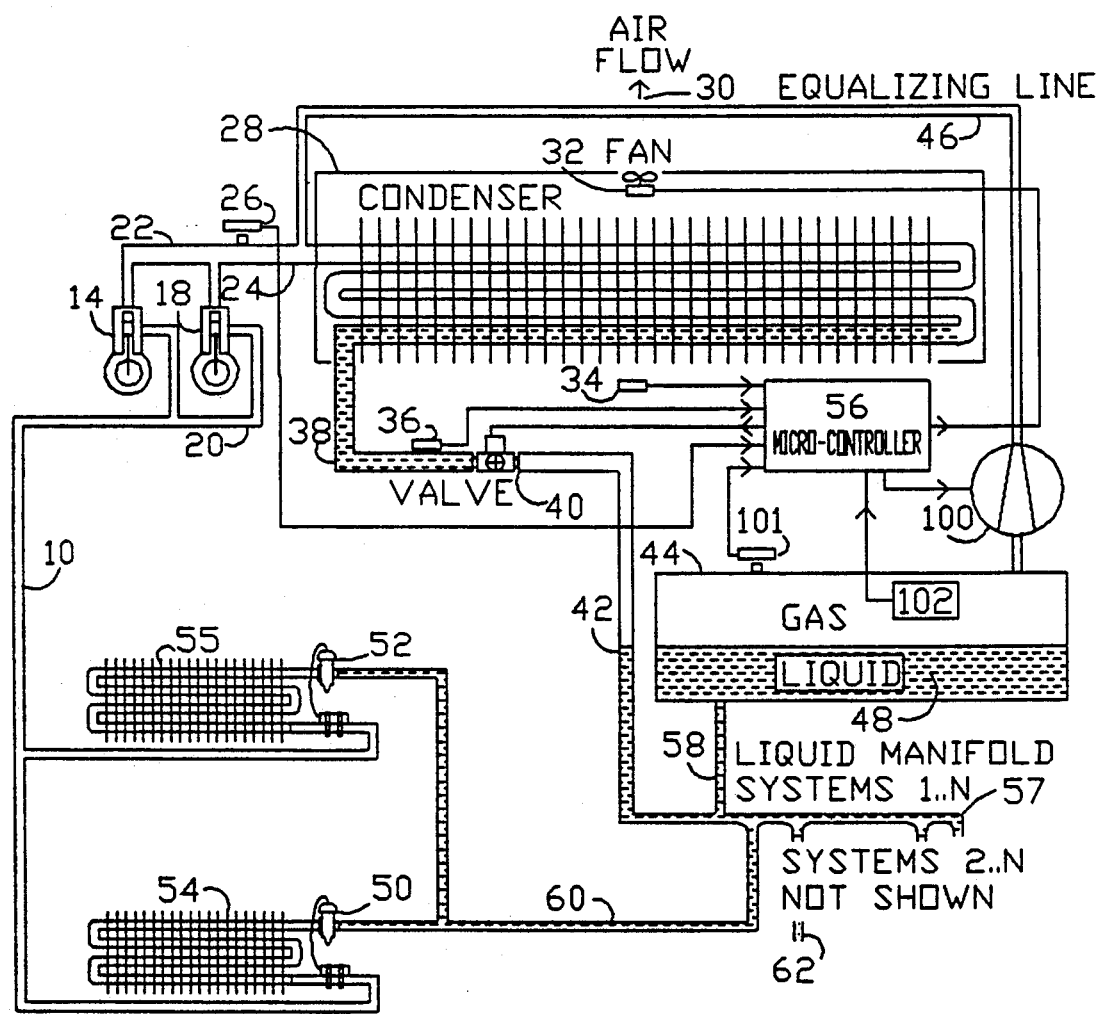
FIG. 1 depicts a refrigeration system embodying the invention.

The present invention provides a refrigeration system and method wherein improved efficiency is obtained by compressing a refrigerant to a high pressure and temperature, condensing the refrigerant within a condenser, regulating the flow of condensate leaving the condenser with a flow control valve, measuring the subcooling of the condensate and controlling the condensate flow out of the condenser so as to obtain a desired amount of subcooling.

The refrigeration system of the invention includes a compressor, condenser, evaporator, and control system which provides subcooling within the refrigerant condenser by regulating the flow of the refrigerant through the condenser in a manner which always floods the condenser during normal operation. This is accomplished by not allowing the condensed liquid to leave the condenser unless it has been cooled below the condensate point. The condenser surface is allowed to drop to a temperature below the condensing temperature at the points where subcooling is to take place. By selectively allowing the liquid to remain in contact with the condenser surface in a controlled manner further increase in efficiency of a refrigeration system during higher condensing temperatures is achieved.

Electronic control is accomplished by monitoring the temperature difference between the subcooled liquid leaving the condenser and the ambient air entering the condenser and reducing the flow of the condensed refrigerant out of the condenser by means of a flow control valve if this temperature difference is greater than a predetermined value and increasing the flow if this temperature difference is less than the preselected value. This allows subcooling while minimizing the amount of refrigerant necessary for the subcooling. In implementing such a control strategy potential control problems arise with a stalled flow condition which can elevate the head pressures to an unsafe level. This problem is solved by several methods.

In one method the control strategies are overridden and unrestricted flow of the liquid leaving the condenser is allowed if this condition is detected or suspected. In another, minimum flow points are established. Yet in another, a safety valve (not shown) is installed in parallel with the flow control valve and allows condensed refrigerant to leave when a high pressure at the condenser is detected. Still in another, a safety valve is installed in parallel with the flow control valve which allows the condensed refrigerant to leave when a high differential pressure across the flow control valve exists.

The functions of controlling the pressure based on the pressure and the subcooling based on temperature can be interchanged, i.e., the pressure can be controlled by controlling the flow valve and the subcooling is controlled by controlling the air flow.

Passive subcooling control is accomplished in several ways. In one embodiment an inverted trap in the tubing leaving the condenser can maintain liquid within the condenser and cause the liquid to be subcooled before it leaves the condenser. The degree of subcooling is not controlled and consequently this is not as efficient as the previously described electronic control method, however it is a significant improvement.

In another embodiment a differential valve is placed in the outlet of the condenser and the amount of liquid which is maintained in the condenser is dependent on the pressure differential of this valve. The densities of most refrigerants are similar and they produce approximately 0.5 psi per foot of standing liquid.

The effects of these methods can be enhanced by slanting the tubing passes within the condenser allowing better draining and heat transfer. When the last pass of the condenser is tilted such that the refrigerant is drained from the condenser by gravity, the gradient effect of the subcooling allows less condenser surface to be used to achieve a given result.

The equalization of the pressures in the condenser and between the condenser and the receiver with equalization tubes allow gravity to be used in a controlled fashion to empty the condenser and minimize the amount of condensate required to achieve a given effect.

FIG. 1 depicts an embodiment of the refrigeration system of the present invention. The system includes at least one compressor, at least one condenser, at least one evaporator with an expansion device, at least one cooling fan, a reservoir for holding liquid refrigerant, a pressure sensor at the condenser outlet to measure the pressure of the condensed (liquid) refrigerant, a control valve to regulate the flow of the subcooled liquid refrigerant from the condenser to the reservoir, and a control circuit containing a microprocessor to control various functions of the refrigeration system including the control valve, secondary compressor and cooling fan. The refrigeration system also may contain a secondary compressor to controllably compress refrigerant vapor from the reservoir to the condenser inlet.

Referring to FIG. 1, the refrigeration system depicted therein is a closed loop commonly piped multiple-stage refrigeration system. A vapor refrigerant at a low pressure is passed into compressors 14 and 18 via a refrigerant tube 10. The compressors 14 and 18 compress the refrigerant to a high pressure gaseous state and discharge it through refrigerant tubes 22 and 24 into a condenser 28. The high pressure transducer 26 is installed in the refrigerant tube 24, which provides an electrical signal that is representative of the pressure of the gases in the refrigerant tube 24 to a microcontroller circuit 56.

The microcontroller circuit 56 contains a microprocessor and other circuitry which enables it to acquire information from various sensors used in the refrigerator system, to process these signals and to control a variety of functions of the refrigeration system.

Still referring to FIG. 1, the condensed refrigerant leaves the condenser 28 through pipe 38 as a liquid. A temperature sensor 36 is installed on a liquid return line which measures the temperature of the liquid refrigerant and provides a corresponding signal to the microcontroller 56. A flow control valve 40 is installed in the liquid return line 38, which controllably discharges the liquid refrigerant from the liquid line 38 into a main liquid reservoir 44 through a main tube 58. The operation of the control valve 40 is controlled by the microcontroller 56. The sequence and the method used to control the operation of the control valve 40 is described in more detail later.

Another temperature sensor 34 is provided near the condenser 28 to monitor the temperature of the ambient air entering the condenser 28. Sensor 34, like other sensors in the refrigeration system, provides an electrical signal to the microcontroller which is representative of the ambient temperature.

The liquid from the reservoir 44 flows through a tube 58 into a liquid manifold system 57, where it enters a liquid tube that is connected to expansion valves 50 and 52. Each expansion valve 50 and 52 is connected to separate evaporators 54 and 55 respectively. These evaporators form a single temperature refrigeration system wherein the expansion valves 50 and 52 meter the liquid refrigerant into evaporation 54 and 55 respectively. Similarly, other refrigeration systems (not shown) may be connected to the liquid manifold system through tubes 62 and the like. When the liquid refrigerant is metered through the expansion valves 50 or 52, it evaporates into a gaseous state within its respective evaporator at a low pressure and a low temperature. The vapor refrigerant is passed to the compressors 14 and 18 through the suction refrigerant tube, which completes a refrigerant cycle that is continuously repeated during operation.

Figure 2:
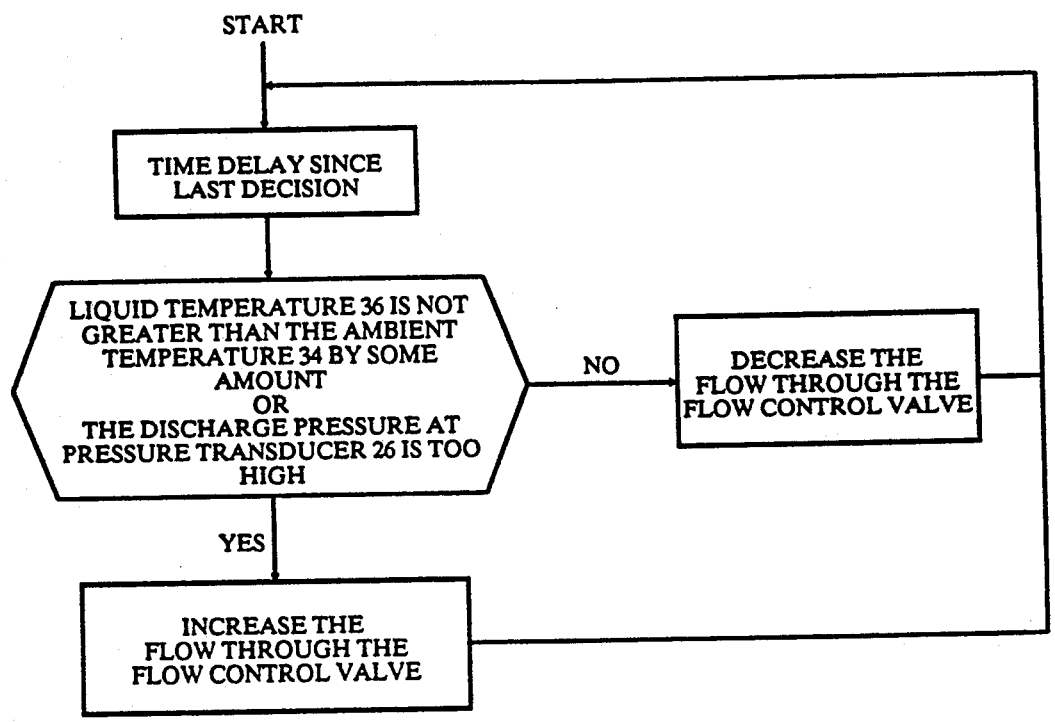
FIG. 2 depicts an algorithm for the control of a flow control valve of the refrigeration.

The operation of the control valve will now be described in more detail while referring to FIGS. 1 and 2. As described earlier, the temperature sensor 36 measures the temperature of the liquid refrigerant leaving the condenser 28 and the temperature sensor 34 measures the ambient air temperature entering the condenser 28. When the refrigerator system is operating, the high pressure gaseous refrigerant from the compressors 14 and 18 is cooled in the condenser to condense it into a liquid state. As the refrigerant vapor travels through the condenser 28, it begins to condense into droplets on the inner walls of the condenser pipes. The control valve 40 prevents the flow of the entire liquid refrigerant from the condenser 28 to the reservoir 44 thereby enabling some of the liquid refrigerant to accumulate in the condenser pipe 38. The microcontroller 56 regulates the liquid refrigerant flow through the control valve 40 as a function of the difference between the liquid refrigerant temperature (ascertained by the temperature sensor 36) and the ambient temperature (ascertained by the temperature sensor 34). When the temperature difference between the liquid refrigerant temperature and the ambient temperature ("$\Delta t$") is greater than a predetermined value, the microcontroller 56 decreases the flow through the control valve 40. On the other hand, when the temperature difference $\Delta t$ is less than the predetermined value, the microcontroller increases the flow through the control valve 40. A time delay between successive decisions to alter the flow through the control valve is programmed into the microcontroller t smooth out the operation of the control valve. In practice, the microcontroller is programmed to regulate the liquid refrigerant flow through the control valve so as not to fill the condenser excessively, because that will increase the liquid refrigerant pressure at the sensor 26, which in turn will decrease the system efficiency. The above described decision making process is illustrated in the flow chart of FIG. 2. The operation or the method described above ensures that during operation there is always maintained an amount of liquid refrigerant in the condense which is sufficient to provide subcooling of the liquid refrigerant before it is discharged into the reservoir 44. The liquid refrigerant flow through the control valve may be controlled by either pulse modulating or analog modulating the flow control valve 40. It is desirable not to let the flow through the condenser stop completely because that can result in loss of control. This can be accomplished, in the case of a pulse modulated valve, by providing a minimum pulse width or a minimum duty cycle. In summary, the continuous flooding of the condenser by controlling flow through the control valve 40 provides subcooling at all ambient temperatures, which increases the efficiency of the refrigeration system.

Determining what the desired condensing pressure is may depend upon factors such as whether the system is equipped with hot gas defrost or a reheat condenser.

Figure 4:
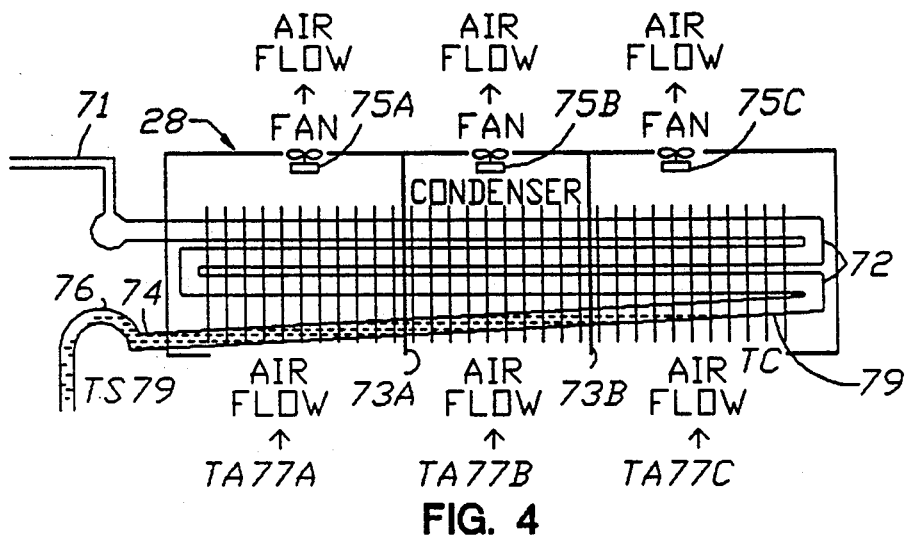
FIG. 4 depicts a condenser with an improved piping scheme for enhancing the subcooling.

In some applications, it may be more desirable to partition the condenser area into zones with sections and regulate the air through each zone by employing multiple fans. One such system is shown in FIG. 4 Here the condenser section is partitioned with partitions 73A and 73B. This is done to more evenly and efficiently control the pressure that is maintained within the condenser 28. The ambient air Ta 77A, 77B and 77C flowing into each section is independently controlled by controlling fans 75A, 75B and 75C respectively. An advantage in providing a higher rate of air flow through Section 77A and less through Section 77B and eve less through Section 77C is that it aids in subcooling the refrigerant leaving the condenser 28.

Figure 3:
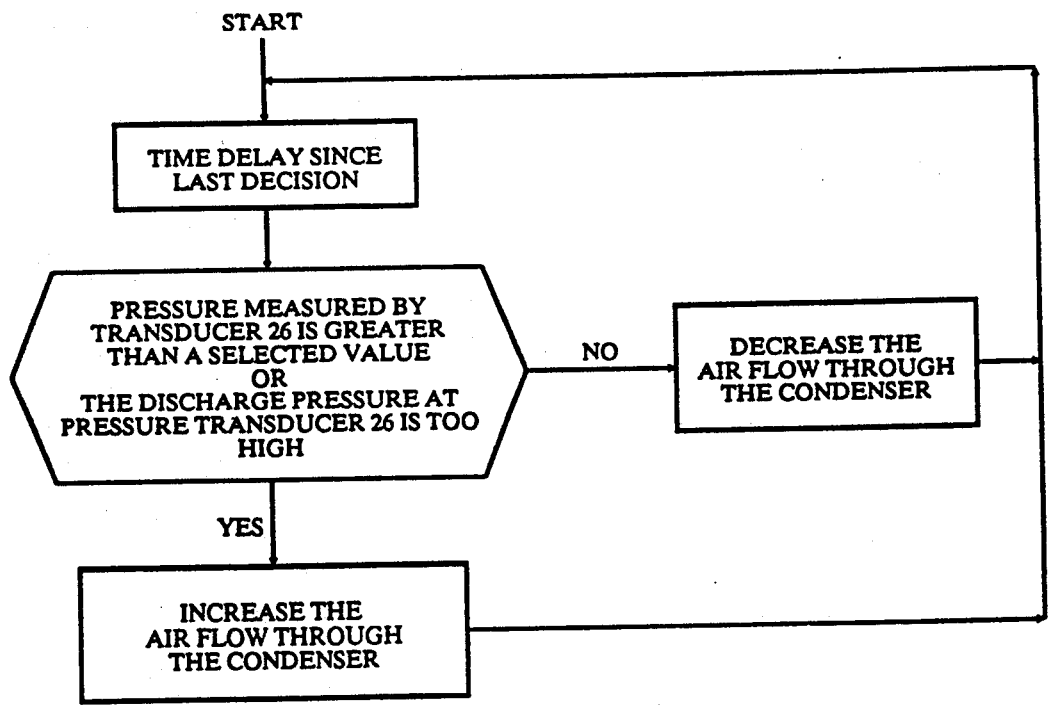
FIG. 3 depicts an algorithm for the control of condenser fans of the refrigeration system of FIG. 1.

In the system of the invention described above, the amount of subcooling is controlled by the amount of flooding in the condenser and the condenser pressure is controlled by the air flow through the condenser 28. In FIGS. 2 and 3, temperature pressure may be interchanged so that the condenser pressure is controlled by the amount of flooding in the condenser while the amount of subcooling is controlled by the amount of air flow through the condenser.

Further improvement in the overall system efficiency may be obtained by regulating the fan speed as a function of the discharge pressure of the gaseous refrigerant into the condenser. The microcontroller 56 also controls or regulates the fan 32 to optimize the condensation of the gaseous refrigerant entering the condenser 28. The flow chart of FIG. 3 shows the control logic for the fan 32. As shown in FIG. 3, when the pressure represented by the pressure transducer 26, i.e., the discharge pressure of the gaseous refrigerant entering into the condenser 28 is above a predetermined value, the microcontroller will increase the fan speed thereby causing it to increase air flow through the condenser. On the other hand, when the discharge pressure is below the predetermined value, the microcontroller will decrease the fan speed, thereby decreasing the air flow through the condenser. Also, a time delay between successive speed controls is provided to avoid changing the fan speed too frequently.

Referring back to FIG. I, in certain applications it may be more desirable to directly transfer the liquid refrigerant from the condenser 28 to the reservoir 44. This, however, would allow the liquid refrigerant 48 to absorb energy while in the reservoir especially when the reservoir is not sufficiently insulated. This loss of energy will result in a lower overall efficiency of the refrigeration system.

Still referring back to FIG. 1, the present invention provides further improvement in overall system efficiency by providing a secondary compressor 100 in an equalization line 46 disposed between the reservoir 44 and the condenser inlet. The secondary compressor 100, when in operation, compresses the refrigerant vapor from the reservoir 44 to the condenser inlet, where they are mixed with the high pressure gaseous refrigerant from the compressors 14 and 18. This evaporation action removes heat from the liquid refrigerant in the reservoir 44 and, thus, reduces the temperature and pressure in the reservoir 44, thereby further improving the overall efficiency of the refrigeration system. The compressor action is controlled by the microcontroller 56, which receives input from a pressure transducer 101 and a liquid level transducer 102, both of which are mounted on the reservoir. Transducer 102 senses the liquid level in receiver 48 and turns off compressor 100 if the level is too high. The reduced pressure in the reservoir also improves the draining of the liquid refrigerant from the condenser 28 to the reservoir 44. Additionally, this method maintains a more constant pressure on the liquid line 60, which further improves operation of the expansion valves 50 and 52. This also allows for more of the energy to be taken out of the refrigerant by the compressor 100, which has a higher coefficient of performance than compressors 14 and 18. Since high compression ratios are not of benefit, compressor 100 may be of a scroll or centrifugal type.

Figure 6:
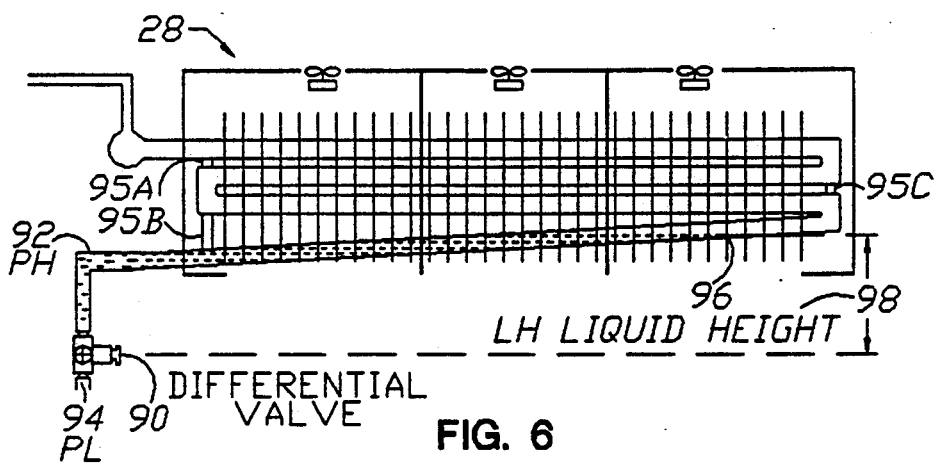
FIG. 6 depicts a condenser with passive subcooling.

FIG. 6 shows a passive method of flooding the condenser, i.e., the control is not reacting to the actual amount of subcooling which is taking place in the condenser, instead it is maintaining a liquid presence in the condenser by means of trapping the liquid. The embodiment depicted in FIG. 6 accomplishes this with differential pressure regulating valve 90 which responds to the weight of the liquid within the condenser. Liquid 96 has a weight associated with the height of its accumulation, typically on the order of 0.5 psi per foot. As the weight of the liquid divided by the cross-sectional area of the valve opening exceeds the pressure differential established by differential pressure valve 90 the valve opens allowing liquid to be transmitted. The pressure differential can be determined by measuring the pressure 92 Ph and 94 Pl and computing the difference. This pressure differential can be equated to Lh (the height of the liquid) 98 which is maintained in the condenser. A further improvement in the construction of condenser 28 can be achieved by sloping the last pass of condenser tubing 96. Optional equalization tubes 95A, 95B and 95C will improve the flow of condensate through the condenser by allowing the liquid which condenses in any tube to drain directly out at that point and not have to run through all remaining tubes before leaving the condenser.

It is also possible to pipe in parallel with flow control valve 40 of FIG. 1 differential pressure valve 90 of FIG. 6. This sill provide a fail-safe method of preventing an excess accumulation of liquid.

Figure 7:
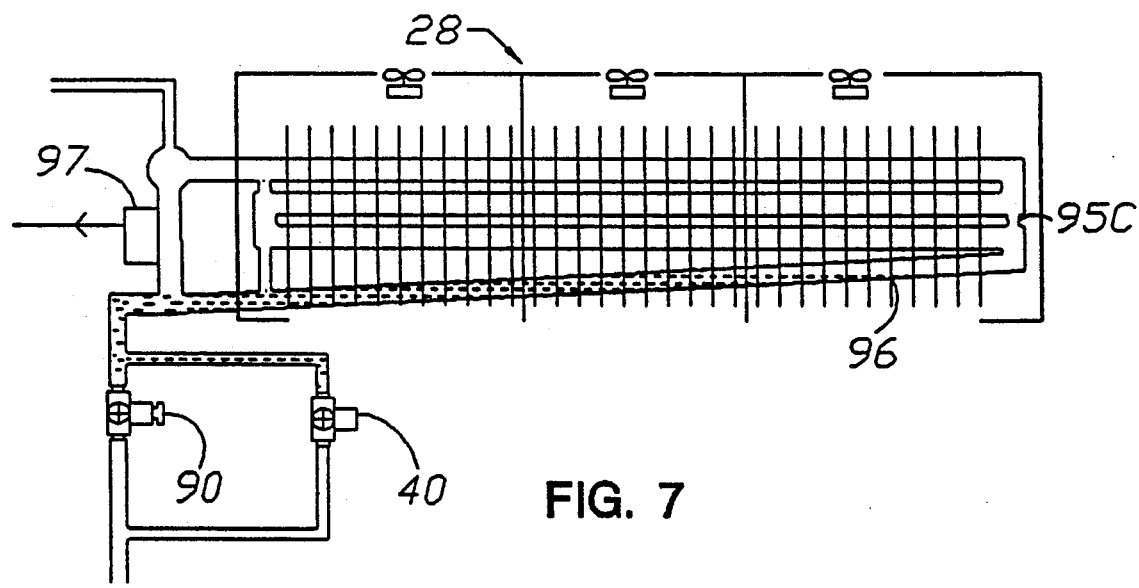
FIG. 7 depicts a condenser equipped with a liquid level transducer.

In FIG. 7, a liquid level transducer 97 is used to monitor the liquid level in condenser 28. This signal may be used by micro-controller 56 to control the liquid level. Flow control valve 40 is used n parallel with the differential valve 90. Differential valve 90 serves to protect against a failure of valve 40 to operate properly. Liquid level transducer 97 may also be used to determine in conjunction with liquid level monitor 102 the amount of liquid residing on the condensing side of the refrigeration system.

Figure 5:
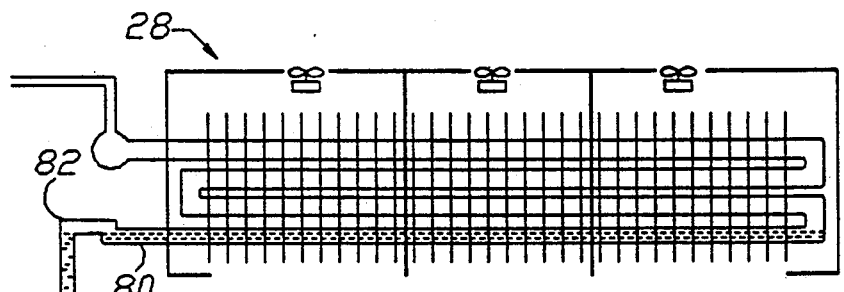
FIG. 5 depicts a conventional condenser with passive subcooling.

In FIG. 5, liquid 80 leaving the condenser is maintained at a constant level by inverted trap 80. This allows the liquid to be subcooled before leaving the condenser.

The condenser must be designed in such a way that the entering fluid from compression does not heat the subcooled fluid exiting the condenser. Therefore, it is beneficial to control the air flow through the condenser in by modulating the speed of all the motors which are running so they have air flow over the entire surface of the condenser. This provides a temperature gradient through the condenser and allows the bottom passes to subcool the refrigerant easier. If one of the fans is cycled it is necessary to stop the back feed of air through the fan which is cycled; this is typically achieved with swinging dampers located in the discharge air of the fans which are held open by the flow of air. In the case of a water cooled condenser the method of water flow through the condenser can achieve the same optimization. The air flow may also be modulated by motorized dampers on the face of the condenser.

While the invention has been described in accordance with air cooled condensers, one experienced in the art may easily apply the invention to water or fluid cooled condensers of all sorts. It is intended that the current patent shall apply to all sorts of condensers. These embodiments have not been specifically described because they are considered redundant in application of the invention in view of the above description

What is claimed is:

1. A refrigeration system having in a closed loop connection a compressor for compressing a refrigerant, a condenser for condensing the compressed refrigerant into a liquid refrigerant and discharging it at a condenser outlet, and an evaporator for evaporating the liquid refrigerant, said refrigeration system further comprising:
    (a) a control valve connected to the condenser outlet for trapping liquid refrigerant in the condenser by controlling the discharge of the condensed refrigerant therethrough;
    (b) a temperature sensor for providing an electrical signal representative of the temperature of the liquid refrigerant near the condenser outlet;
    (c) a temperature sensor for providing an electrical signal representative of the ambient temperature; and
    (d) a control circuit coupled to the control valve for controlling the liquid refrigerant discharge therethrough as a function of the temperature difference between the ambient temperature and the liquid refrigerant temperature.

2. A refrigeration system containing in a closed loop connection a compressor for compressing a refrigerant, a condenser for condensing the compressed refrigerant into a liquid refrigerant and discharging the liquid refrigerant through an outlet into a reservoir, said refrigeration system further comprising:
   (a) an electrically operable control valve connected between the condenser outlet and the reservoir for controlling the liquid refrigerant discharge from the condenser into the reservoir;
   (b) a temperature sensor connected near the condenser outlet for providing an electrical signal that is representative of the temperature of the liquid refrigerant near the condenser outlet;
   (c) a temperature sensor placed near the condenser for providing an electrical signal that is representative of the ambient temperature; and
   (d) a control circuit electrically connected to the temperature sensors and the control valve, said control circuit causing the control valve to increase the refrigerant flow therethrough when the temperature difference ("$\Delta t$") between the ambient temperature and the temperature of the liquid refrigerant is less than a predetermined value to decrease the refrigerant flow therethrough when the $\Delta t$ is greater than the predetermined value.

3. A refrigeration system containing in a closed loop connection a compressor for compressing a refrigerant, a condenser for condensing the compressed refrigerant into a liquid refrigerant and discharging the liquid refrigerant through an outlet into a reservoir, said refrigeration system further comprising:
   (a) an electrically operable control valve connected between the condenser outlet and the reservoir for controlling the liquid refrigerant discharge from the condenser into the reservoir;
   (b) a variable speed fan for providing airflow through the condenser;
   (c) a temperature sensor connected near the condenser outlet for providing an electrical signal that is representative of the temperature of the liquid refrigerant near the condenser outlet;
   (d) a temperature sensor placed near the condenser for providing an electrical signal that is representative of the ambient temperature; and
   (e) a control circuit connected to the control valve and the temperature sensors, said control circuit increasing the fan speed and decreasing the flow through the control valve when the temperature difference ("$\Delta t$") between the ambient temperature and the temperature of the liquid refrigerant is greater than a predetermined value and decreasing the fan speed and increasing the discharge through the control valve when the $\Delta t$ is less than the predetermined value.

4. A refrigeration system containing in a closed loop connection a compressor for compressing a refrigerant, a condenser for condensing the compressed refrigerant into a liquid refrigerant and discharging the liquid refrigerant through an outlet into a reservoir, said refrigeration system further comprising:
   (a) an electrically operable control valve connected between the condenser outlet and the reservoir for controlling the liquid refrigerant discharge from the condenser into the reservoir;
   (b) a variable speed fan for providing airflow through the condenser;
   (c) a secondary compressor connected between the reservoir and the condenser for transferring refrigerant vapors from the reservoir to the condenser;
   (d) a temperature sensor connected near the condenser outlet for providing an electrical signal that is representative of the temperature of the liquid refrigerant near the condenser outlet;
   (e) a temperature sensor placed near the condenser for providing an electrical signal that is representative of the ambient temperature; and
   (f) a control circuit electrically coupled to the fan, secondary compressor, control valve and temperature sensors, said control circuit controlling the fan speed and the discharge through the control valve in response to the temperature difference between the ambient temperature and the temperature of the liquid refrigerant so as to always subcool the liquid refrigerant in the condenser before discharging it into the reservoir, said control circuit also controlling the operation of the secondary compressor.

5. A refrigeration system containing in a closed loop connection a compressor for compressing a refrigerant, a condenser for condensing the compressed refrigerant into a liquid refrigerant and discharging the liquid refrigerant through an outlet into a reservoir, said refrigeration system further comprising:
   (a) an electrically operable control valve connected between the condenser outlet and the reservoir for controlling the liquid refrigerant discharge from the condenser into the reservoir;
   (b) a variable speed fan for providing airflow through the condenser;
   (c) a secondary compressor connected between the reservoir and the condenser for compressing refrigerant vapor from the reservoir to the condenser;
   (d) a temperature sensor connected near the condenser outlet for providing an electrical signal that is representative of the temperature of the liquid refrigerant near the condenser outlet;
   (e) a temperature sensor placed near the condenser for providing an electrical signal that is representative of the ambient temperature; and
   (f) a microprocessor based control circuit electrically connected to the temperature sensors, fan, control valve and secondary compressor, said control circuit controlling the discharge through the control valve as a function of the temperature difference between the ambient temperature and the temperature of the liquid refrigerant, and the fan speed to regulate the airflow around the condenser so as to enable the subcooling of the liquid refrigerant before discharging it into the reservoir.

6. A multi-stage refrigeration system having in a closed loop connection a plurality of commonly piped compressors for compressing refrigerant vapor and discharging it into the inlet of a condenser for condensing the refrigerant vapor into a liquid refrigerant, said condenser discharging the liquid refrigerant from an outlet into a reservoir, at least one evaporator for evaporating the liquid refrigerant, said refrigeration system further comprising:
   (a) an electrically operable control valve having an inlet and an outlet end, said inlet end of the control valve connected to the condenser outlet, said control valve controlling the discharge of the liquid refrigerant from the condenser;

(b) a reservoir adapted to store a body of liquid refrigerant therein, connected to the outlet of the control valve through a pipe for receiving the liquid refrigerant from the condenser through the control valve, said reservoir also connected to each said evaporator for discharging the liquid refrigerant to each said evaporator;

(c) a secondary compressor connected between the reservoir and the condenser inlet for compressing refrigerant vapor from the reservoir to the condenser inlet;

(d) a temperature sensor connected near the condenser outlet for producing an electrical signal representative of the liquid refrigerant temperature near the condenser outlet;

(e) a temperature sensor placed in the general vicinity of the condenser for producing an electrical signal representative of the ambient temperature;

(f) a temperature sensor connected to the reservoir for producing an electrical signal representative of the temperature of the liquid refrigerant therein;

(g) a level detection sensor placed in the reservoir for detecting the liquid refrigerant level in the reservoir;

(h) a microprocess based control circuit electrically connected to each said temperature sensor, the level detection sensor, secondary compressor, control valve and fan, said control circuit causing the control valve to meter the liquid refrigerant discharge therethrough, so that during operation the control valve always discharges a minimum amount of liquid but increases the liquid refrigerant discharge when the temperature difference ("$\Delta t$") between the ambient temperature and the temperature of the liquid refrigerant near the condenser outlet is less than a predetermined value and decreases the liquid refrigerant discharge when the $\Delta t$ is greater than the predetermined value, said control circuit controlling the operation of the secondary compressor as a function of the temperature of the liquid refrigerant in the reservoir and the fan speed as a function of the $\Delta t$.

7. A refrigeration condenser for condensing a compressed gas refrigerant into a liquid refrigerant and discharging the liquid refrigerant in a subcooled state at a condenser outlet, said condenser comprising:

(a) a control valve connected to the condenser outlet for trapping liquid in the condenser by controlling the flow of the liquid refrigerant therethrough; and (b) a circuit operatively coupled to the control valve for providing a signal representative of the temperature difference between the temperature of the liquid refrigerant being discharged from the condenser and the ambient temperature of the condenser cooling media and for controlling the flow through the control valve in response to said signal.

8. A refrigeration condenser for condensing therein a gas into a liquid refrigerant and discharging the liquid refrigerant at a condenser outlet, comprising:

(a) a control valve connected to the condenser outlet; and (b) a circuit operatively coupled to the control valve for controlling the liquid refrigerant flow through the control valve as a function of the temperature difference between the ambient temperature and the liquid refrigerant temperature in the condenser.

9. The apparatus of claim 1, wherein the control circuit contains a micro-controller.

* * * * *